United States Patent Office 3,137,627
Patented June 16, 1964

3,137,627
N - (1 - PYRROLIDINOMETHYL)TETRACYCLINE AND ACID COMPOSITIONS FOR AQUEOUS ACIDIFIED INJECTIONS HAVING A pH OF NOT MORE THAN ABOUT 4
Frank H. Buckwalter, De Witt, and Murray A. Kaplan, Syracuse, N.Y., assignors to Bristol-Myers Company, New York, N.Y., a corporation of Delaware
No Drawing. Filed Mar. 12, 1962, Ser. No. 179,241
9 Claims. (Cl. 167—65)

This invention relates to new therapeutic compositions comprising N-(1 - pyrrolidinomethyle)tetracycline and, more particularly, to therapeutic compositions comprising N-(1-pyrrolidinomethyl)tetracycline nitrate.

This application is a continuation-in-part of our pending application Serial No. 831,029, filed August 3, 1959, now abandoned.

It is the object of the present invention to provide new therapeutic compositions useful in the treatment of bacterial infections. It is a further object of this invention to provide antibiotic compositions of enhanced stability which can be administered both intramuscularly and intravenously as a true solution in a dosage unit no larger than about 2 to 3 cubic centimeters. It is another particular object of this invention to provide an antibiotic composition of enhanced color stability both as a dry powder and as an aqueous solution. It is also an object of the present invention to provide an antibiotic composition which will cause less pain upon administration than presently known antibiotics, e.g., tetracycline, oxytetracycline, chlortetracycline, tetracycline sodium hexametaphosphate complex, etc. It is also a specific object of this invention to provide a therapeutic composition which, upon intramuscular administration to man, will result in the rapid attainment of enhanced blood levels of tetracycline activity. It is a further object of the invention to provide a composition in which the absorption and utilization of the administered antibiotic is greatly enhanced.

The objectives of the present invention have been achieved by the provision of a substantially anhydrous mixture giving, upon reconstitution with water, an aqueous, injectable, therapeutic solution at a pH of not more than about 4, comprising a member selected from the group consisting of N-(1-pyrrolidinomethyl)tetracycline and the nontoxic acid addition salts thereof.

Many of the chemical and physical properties, and means for the preparation of the antibiotic compounds included in the compositions of the present invention, i.e., N-(1-pyrrolidinomethyl)tetracycline and its nontoxic acid addition salts, are known to the skilled in the art. [See the article entitled "Carboxamido Derivatives of the Tetracyclines," by Gottstein et al., J.A.C.S. 81, pages 1198–1201 (1959); and Seidei et al., Munch. med. Wochschr. 17, page 661 (1958)].

N-(1-pyrrolidinomethyl)tetracycline, which is also sometimes called N-(1-pyrrolidinylmethyl)tetracycline, can be prepared according to the procedures set forth in chapter 10, Organic Reactions, volume 1, pages 303–341, published in 1942 by Wiley and Sons, New York, and the references therein. Thus about one mole of pyrrolidine is reacted with at least one mole of formaldehyde, or a polymer thereof, and about one mole of tetracycline. One preferred method for the preparation of N-(1-pyrrolidinomethyl)tetracycline is illustrated by Example 1 below. The nontoxic acid addition salts of the compound are simply prepared by the addition of one equivalent of acid to the base; these salts include those prepared from acids such as hydrochloric, nitric, sulfuric, sulfamic, tartaric, hydrobromic, hydriodic, glycolic, citric, maleic, phosphoric, polyimido phosphoric, succinic, acetic, ascorbic and the like. The novel nitrate salt is prepared according to the procedure set forth in Examples 6 and 7 below and ordinarily occurs in the form of a hydrate.

It has now been discovered that the blood levels obtained upon the intramuscular administration to man of N-(1-pyrrolidinomethyl)tetracycline, or of its nontoxic acid addition salts, are unexpectedly increased when the injected aqueous solution of the antibiotic is at a pH of not more than about 4 and preferably at a pH of 3 to 4. A composition having a pH lower than about 3 provides enhanced blood levels but results in increased pain upon injection. It is therefore desirable that the composition of the present invention incorporate a nontoxic, dry, water-soluble acidifying agent, whereby the entire composition upon reconstitution with water will be maintained at a pH of not more more than 4, and preferably about 3 to 3.5.

We have found that the nontoxic α-hydroxycarboxylic acids, which contain no elements other than carbon, hydrogen, and oxygen, are excellent agents with which to make the aforementioned pH adjustment. Other nontoxic, dry, water-soluble, acidifying agents which do not interfere with the antibiotic may also be employed, e.g., carbamide phosphoric acid, glycine hydrochloride, glutamic acid hydrochloride and sulfamic acid. The nontoxic α-hydroxycarboxylic acids of use in the present invention include citric gluconic, tartaric, maleic, malic, ascorbic, mandelic and pyruvic acids and their nontoxic salts such as sodium citrate; such acids are included with the antibiotic of the present invention in amounts sufficient to make the desired adjustment upon reconstitution of the mixture with water. The preferred acidifying agents are ascorbic acid and citric acid.

When the therapeutic compositions of this invention are to be administered intramuscularly, it is frequently desirable, but not essential, to add to the composition of this invention a local anesthetic, e.g., a local water-soluble anesthetic such as lidocaine hydrochloride or procaine hydrochloride. The quantity of such an anesthetic incorporated in the composition of this invention may vary widely, as will be readily perceived by the skilled in the art; we prefer to add about 40 mg. of lidocaine hydrochloride to each dosage unit which upon reconstitution with water makes up to a volume of from about 2 to 3 cc. The local anethetic is not used when the composition is to be administered intravenously.

Since the solubility in water at 25° C. of pyrrolidinomethyl tetracycline nitrate is about 25 mg./ml., i.e., much lower than the solubility of pyrrolidinomethyl tetracycline, we have found it desirable to include in compositions comprising pyrrolidinomethyl tetracycline nitrate a solubilizing agent which does not interfere with the antibiotic. We have found magnesium gluconate to be a suitable solubilizing agent through many similar solubilizing agents can be used, e.g., calcium and aluminum gluconate, urea, nicotinamide, etc.

Therapeutic dosages of tetracycline are usually expressed in terms of tetracycline hydrochloride activity, which means the weight of tetracycline hydrochloride which would be needed to give the same amount of antibacterial activity as is given by whatever weight is present of the antibiotic actually used. Anhydrous amphoteric tetracycline has a potency of 1080 mcg./mg., and thus only 926 mg. need be used to provide a dose of one gram. Unless referred to as "doses" of "tetracycline hydrochloride activity," the weights herein are actual weights.

In the case of N-(1-pyrrolidinomethyl)tetracycline, which has a potency of about 660 mcg. of tetracycline hydrochloride activity per mg., use is made of 758 mg. to provide what is usually called a 500 mg. dose, i.e., a dose equivalent to 500 mg. tetracycline hydrochloride. If desired, as is frequently the case, a 10% excess for "overfill" may be provided by the use of about 834 mg. of such a lot of N-(1-pyrrolidinomethyl)tetracycline. Similarly, to obtain a dosage of 250 mg. (tetracycline hydrochloride activity), it is necessary to use 397 mg. of N-(1-pyrrolidinomethyl)tetracycline having a potency of 660 mcg./mg.

The therapeutic activity of pyrrolidinomethyl tetracycline nitrate can be expressed either in terms of tetracycline hydrochloride activity or pyrrolidinomethyl tetracycline activity. Pure pyrrolidinomethyl tetracycline is defined to have a standard activity of 1000 mcg./mg.; on this standard, pyrrolidinomethyl tetracycline nitrate has an activity of 850 mcg./mg. Such expression can be converted to terms involving tetracycline hydrochloride activity since, as mentioned above, pure pyrrolidinomethyl tetracycline has a potency, expressed in terms of tetracycline hydrochloride activity, of 660 mcg./mg. of tetracycline hydrochloride activity. Thus to provide a dosage equivalent to 250 mg. tetracycline hydrochloride activity, use can be made on a weight basis, of 250 mg. tetracycline hydrochloride, 357 mg. pyrrolidinomethyl tetracycline or 412 mg. pyrrolidinomethyl tetracycline nitrate. Similarly, to provide a dosage equivalent ot 150 mg. tetracycline hydrochloride activity, use can be made on a weight basis, of 150 mg. tetracycline hydrochloride, 214 mg. pyrrolidinomethyl tetracycline or 252 mg. pyrrolidinomethyl tetracycline nitrate.

The therapeutic compositions of the present invention include dry mixtures containing from about 125 mg. to 1000 mg. of N-(1-pyrrolidinomethyl)tetracycline, or a nontoxic acid addition salt thereof, in combination with a local anesthetic, if such is desired, and, necessarily, in combination with an amount of a nontoxic water-soluble acidifying agent sufficient to adjust the pH of the solution resulting from the reconstitution of the dry mixture with water to a pH of not more than 4, and preferably to a pH of from 3 to 4.

A preferred formulation of the composition of this invention in dosage unit form is a substantially anhydrous sterile mixture of 275 mg. of N-(1-pyrrolidinomethyl)tetracycline, 40 mg. of lidocaine hydrochloride, and 300 mg. of ascorbic acid; this mixture, upon reconstitution with about 1.6 cc. of sterile water, provides an injectable aqueous solution at a pH of about 3.4 containing about 125 mg. plus 10% "overfill" of tetracycline hydrochloride activity per cc.

Another preferred embodiment of the invention in unit dosage form wherein the nitrate salt is included is a substantially anhydrous (except for water of hydration) sterile mixture of 412 mg. pyrrolidinomethyl tetracycline nitrate (equivalent to 357 mg. pyrrolidinomethyl tetracycline activity), 40 mg. lidocaine hydrochloride, 500 mg. ascorbic acid and 220 mg. magnesium gluconate; this mixture upon reconstitution with about 1.4 ml. of sterile water, provides an injectable aqueous solution at a pH of about 3.1 containing about 250 mg. (plus 10% "overfill," if any) of tetracycline hydrochloride activity per cc.

The actual weight of pyrrolidinomethyl tetracycline nitrate is calculated by the formula $$\frac{350 \times 1000}{\text{Potency of the pyrrolidinomethyl tetracycline in mcg./mg.}}$$

and where pure pyrrolidinomethyl tetracycline nitrate employed is $$\frac{350 \times 1000}{850}$$

or about 412 mg. pyrrolidinomethyl tetracycline nitrate. For intravenous use the composition is formulated in the same proportions with the lidocaine hydrochloride being entirely omitted.

The ingredients are mixed in dry form under sterile conditions and filled into vials. This dry mixture is stable for over two years under normal storage conditions, e.g., at room temperature. Frequently, use is made of vials having a capacity of about 3 to 7.5 cc. Such vials provide conveniently a single dosage but, of course, larger sizes may be used. The product is prepared for immediate use by adding about 1.4 to 1.7 cc. of sterile water or saline solution. With about ten shakes and in less than 30 seconds, all the dry mixture goes into solution to give a final volume of about 2.0 to 2.2 cc., and the product is ready for use; the resulting solution is stable for several hours but is normally used immediately.

Because the final product, after reconstitution with water, is a true solution, the particle size of the ingredients of the dry mixture is not of great importance. However, in order to speed up the rate of solution of these dry solids upon reconstitution, it is convenient and desirable to have all of the ingredients small enough in particle size to pass through a 200-mesh screen.

The present invention is illustrated in certain aspects by the following specific examples.

EXAMPLE 1

*Preparation of N-(1-Pyrrolidinylmethyl)Tetracycline*

Into a suspension of 1.0 gm. (0.0023 mole) of anhydrous tetracycline (U.S.P.) in 50 ml. of t-butyl alcohol is added 0.19 ml. (0.0023 mole) of pyrrolidine and 0.19 ml. (0.0024 mole) of formalin (37% formaldehyde). The mixture is stirred at room temperature for thirty minutes, then heated to boiling on a steam bath and maintained at this temperature for fifteen minutes. The hot solution is filtered by gravity to effect the removal of a small amount of insoluble material and then cooled promptly to 30° C. The yellow solid is collected by filtration, washed with t-butyl alcohol, and dried in vacuo over phosphorus pentoxide to obtain 0.72 g. of N-(1-pyrrolidinylmethyl)tetracycline melting at 160–165° C. with decomposition.

*Analysis.*—Calculated for $C_{27}H_{33}N_3O_8$: C, 61.35; H, 6.29. Found: C, 61.5; H, 6.35.

EXAMPLE 2

In the preparation of a preferred embodiment of the composition of the present invention, 250.2 gm. of N-(1-pyrrolidinylmethyl)tetracycline( having a potency of 660 mcg. tetracycline hydrochloride activity per mg., 180.0 gm. of pulverized ascorbic acid, and 24.0 gm. of pulverized lidocaine hydrochloride were separately screened to pass through a 200-mesh screen and were sterilized in separate containers with ethylene oxide gas in a Sterox-o-matic cabinet, using a ten-hour dry cycle. The lidocaine hydrochloride is dried at about 120° F. until the moisture content (Karl Fischer method) is less than 0.3%. The ingredients were then blended by aseptically screening through a #40 screen followed by mixing until a uniform mixture was obtained. The blended ingredients were then filled into 600 double-coated 7.5 ml. vials, 0.757 gm. (±30 mg.) being placed in each vial. Upon the addition of 1.6 cc. of sterile water to each vial, there is obtained 2.0 cc. of a clear injectable sterile solution having a pH of 3.4, containing 275 mg. tetracycline hydrochloride activity.

EXAMPLE 3

In the preparation of a preferred embodiment of the composition of the present invention, 4170.0 gm. of N-(1-pyrrolidinylmethyl)tetracycline, having a potency of 660 mcg. tetracycline hydrochloride activity per mg., 3000.0 gm. of pulverized ascorbic acid, and 400.0 gm. of pulverized lidocaine hydrochloride were separately screened to pass through a 200-mesh screen and were sterilized in separate containers with ethylene oxide gas in a Sterox-o-matic cabinet, using a ten-hour non-humidified cycle. The lidocaine hydrochloride is dried at about 120° F. until the moisture content (by Karl Fischer method) is less than 0.3%. The ingredients were then blended by tumbling the mixture of the ingredients for four hours in a sterile MacLellan blender. The blended ingredients were then filled into 10,000 double-coated 7.5 ml. vials, 0.757 gm. (±30 mg.) being placed in each vial. Upon the addition of 1.6 cc. of a clear injectable solution having a pH of 3.4, containing 275 mg. tetracycline hydrochloride activity.

EXAMPLE 4

The ability of the preferred composition of this invention and of two related compositions to produce high blood levels in human subjects was determined in a crossover study with results as recorded in Table I below.

an aqueous solution of each of Preparations A and B were administered intramuscularly to each of the same human subjects, and the blood levels attained thereby were determined after periods of 1, 3, 8, and 24 hours.

Each 2 cc. injection of Preparation A contained 250 mg. of tetracycline hydrochloride activity, as N-(1-pyrrolidinylmethyl)tetracycline, plus a 10% "overfill," i.e., a total of 275 mg. of tetracycline hydrochloride activity. Each 2 cc. injection of Preparation B contained 250 mg. of tetracycline hydrochloride activity, as tetracycline sodium hexametaphosphate complex, plus a 20% "overfill," making a total of 300 mg. of tetracycline hydrochloride activity. In addition to the tetracycline hydrochloride activity, each 2 cc. of both Preparation A and Preparation B contained 40 mg. lidocaine hydrochloride and 300 mg. ascorbic acid. It is obvious by comparison of the results set forth in Table II that Preparation A, a composition of the present invention which has a pH of 3.4, gave much higher blood levels without loss of duration than did the prior art composition which had a greater content of tetracycline hydrochloride activity. An additional quantitative measure of the improvement is furnished by plotting the blood levels set forth in Table II and measuring the areas under the curves. The larger area under the curve for Preparation A indicates a surprising increase in the efficiency of adsorption or utilization for Preparation A as compared to the prior art compound.

TABLE I.—TETRACYCLINE SERUM CONCENTRATIONS IN HUMAN SUBJECTS

| Patient | Age | Sex | Wt. | 1 Hour Preparation | | | 3 Hours Preparation | | | 6 Hours Preparation | | | 24 Hours Preparation | | |
|---|---|---|---|---|---|---|---|---|---|---|---|---|---|---|---|
| | | | | A | B | C | A | B | C | A | B | C | A | B | C |
| Homer | 52 | F | 145 | 5.00 | 3.20 | 2.00 | 3.20 | 2.10 | 1.80 | 2.40 | 1.80 | 1.30 | 0.60 | 0.50 | 0.50 |
| Naumann | 43 | F | 148 | 5.40 | 2.70 | 2.90 | 3.10 | 1.80 | 1.70 | 2.40 | 1.50 | 1.10 | 0.60 | 0.40 | 0.50 |
| Smith | 21 | M | 170 | 3.00 | 1.80 | 1.30 | 2.00 | 1.30 | 1.10 | 1.40 | 1.00 | 0.70 | 0.70 | 0.30 | 0.50 |
| Snead | 30 | M | 169 | 4.40 | 1.50 | 1.10 | 2.20 | 1.10 | 2.80 | 1.80 | 0.90 | 1.00 | 0.60 | 0.20 | 0.40 |
| De Joseph | 48 | F | 120 | 4.40 | 3.00 | 2.90 | 3.40 | 2.20 | 1.90 | 2.50 | 1.60 | 1.30 | 0.80 | 0.50 | 0.60 |
| Average | | | | 4.44 | 2.44 | 2.04 | 2.78 | 1.70 | 1.86 | 2.10 | 1.36 | 1.08 | 0.66 | 0.38 | 0.50 |

The preparations under study were as follows:

*Preparation A.*—A sterile aqueous solution at pH 3.4, prepared as described in Example 3, containing 137.5 mg. tetracycline hydrochloride activity, as N-(1-pyrrolidinylmethyl)tetracycline, 20 mg. lidocaine hydrochloride, and 150 mg. ascorbic acid per cc.

*Preparation B.*—A sterile aqueous solution at pH 5.3 containing 137.5 mg. tetracycline hydrochloride activity, as N-(1-pyrrolidinylmethyl)tetracycline, and 15 mg. of p-n-butylamino-salicylic acid-dimethylamino-ethyl ester-hydrochloride per cc.

*Preparation C.*—A sterile aqueous solution at pH 5.3 containing 137.5 mg. tetracycline hydrochloride activity, as N-(1-pyrrolidinylmethyl)tetracycline, per cc.

Two cc. of each of the preparations were administered to each of five patients, and the blood levels attained thereby were measured after periods of 1, 3, 6, and 24 hours after administration.

It is obvious by inspection that the composition of the present invention gave much higher blood levels at every interval than did either of the related compositions.

EXAMPLE 5

The ability of a composition of the present invention and of a prior art tetracycline compound, tetracycline sodium hexametaphosphate complex (described in U.S. Patent 2,791,609), to provide blood levels of tetracycline activity were compared in a crossover study with the results set forth in Table II below. In this study 2 cc. of It was also observed by the clinician conducting the study described above that Preparation A was less painful upon injection than other forms of tetracycline antibiotics, e.g., tetracycline hexametaphosphate complex or tetracycline hydrochloride.

TABLE II.—TETRACYCLINE SERUM CONCENTRATIONS IN HUMAN SUBJECTS

| Patient | Age | Wt. | 1 Hour Preparations | | 3 Hours Preparations | | 8 Hours Preparations | | 24 Hours Preparations | |
|---|---|---|---|---|---|---|---|---|---|---|
| | | | A | B | A | B | A | B | A | B |
| 1 | 27 | 133 | 4.30 | 1.60 | 3.10 | 1.30 | 2.20 | 0.80 | 0.70 | 0.50 |
| 2 | 29 | 126 | 5.20 | 1.60 | 3.30 | 1.50 | 2.20 | 1.00 | 0.60 | 0.50 |
| 3 | 30 | 143 | 3.20 | 1.60 | 2.40 | 1.10 | 2.00 | 0.80 | 0.70 | 0.40 |
| 4 | 25 | 144 | 3.10 | 1.30 | 2.40 | 1.00 | 1.79 | 0.70 | 0.60 | 0.40 |
| 5 | 39 | 128 | 1.70 | 1.50 | 3.40 | 1.30 | 2.30 | 1.00 | 0.90 | 0.60 |
| 6 | 37 | 122 | 5.60 | 4.20 | 4.00 | 1.40 | 2.10 | 1.10 | 0.80 | 0.50 |
| 7 | 28 | 147 | 3.00 | 1.60 | 2.70 | 1.40 | 1.70 | 1.00 | 0.70 | 0.40 |
| 8 | 27 | 120 | 6.00 | 1.60 | 3.10 | 1.30 | 2.20 | 0.90 | 1.00 | 0.40 |
| 9 | 29 | 129 | 4.40 | 1.70 | 2.50 | 1.30 | 1.50 | | 0.80 | 0.40 |
| 10 | 26 | 147 | 4.40 | 1.40 | 2.20 | 1.10 | 1.60 | 0.90 | 0.70 | 0.50 |
| 11 | 28 | 120 | 4.10 | 1.70 | 2.90 | 1.40 | 2.00 | 1.00 | 0.80 | 0.60 |
| 12 | 30 | 140 | 4.30 | 1.60 | 2.60 | 1.20 | 1.90 | 0.80 | 0.60 | 0.60 |
| 13 | 25 | 147 | 3.70 | 1.70 | 3.10 | 1.40 | 2.10 | 0.90 | 0.70 | 0.60 |
| 14 | 35 | 131 | 4.10 | 1.40 | 3.30 | 1.20 | 2.00 | 1.00 | 0.60 | 0.50 |
| 15 | 34 | 136 | 4.10 | 1.80 | 2.70 | 1.40 | 1.80 | 0.90 | 0.69 | 0.60 |
| Average | | | 4.09 | 1.75 | 2.91 | 1.29 | 1.95 | .092 | 0.72 | 0.49 |

EXAMPLE 6

*Preparation of N-(1-Pyrrolidinomethyl)Tetracycline Nitrate*

A preferred procedure for the preparation of N-(1-pyrrolidinomethyl)tetracycline nitrate is as follows:

(1) Add tetracycline base hydrate (100 gms.) with moderate stirring to 1 liter of methanol containing 35 ml. of 40% aqueous formaldehyde.

(2) To the resulting solution which should have a pH of from about 7 to 8, add pyrrolidine (19.5 ml.) with moderate stirring, maintain the resulting solution at ambient temperature for one hour. Remove insoluble materials from the solution by sterile filtration.

(3) After filtration, add concentrated nitric acid with rapid stirring until the pH is within the range of 1.5 to 2.5 and stir for about 15 minutes. After 15 minutes' stirring, add 20 ml. of water (to form the hydrate of the pyrrolidinomethyl tetracycline) to the reaction mixture and continue stirring for about 2 to 3 hours whereupon N-(1-pyrrolidinomethyl)-tetracycline nitrate is precipitated.

(4) Remove the crystalline product by sterile filtration, pack the crystals well on the filter and wash with 200 ml. of methanol, dry the product under vacuum for 24 hours at 50° C. The crystalline product thus obtained is a stable hydrate of pyrrolidinomethyl tetracycline nitrate having a melting point of 161°–164° C. with decomposition. The yield is 70% to 80% of the theoretical yield.

EXAMPLE 7

In the preparation of a preferred embodiment of the compositions of the present invention 225 gm. of pulverized ascorbic acid, 18.0 gm. of pulverized lidocaine hydrochloride and 99.0 gm. of pulverized magnesium gluconate were separately screened to pass through a 200-mesh screen and were sterilized in separate containers with ethylene oxide gas in a Sterox-o-matic cabinet using a 10-hour cycle with no moisture at 120° F. These materials were all blended aseptically with 160.65 gm. of sterile N-(1-pyrrolidinomethyl)tetracycline nitrate having a potency of 650 mcg./mg. as tetracycline hydrochloride until a uniform mixture was obtained. The blended ingredients were then filled into silicone-coated 7.5 ml. sterile vials, 1.117 gm. (±30 mg.) of the mixture being placed in each vial. Upon the addition of 1.4 cc. of sterile water to each vial, there is obtained 2.0 cc. of a clear injectable sterile solution having a pH of 3.1 containing 357 mg. of pyrrolidinomethyl tetracycline activity which is equivalent to 250 mg. of tetracycline hydrochloride activity.

Each vial of this preparation contains 357 mg. pyrrolidinomethyl tetracycline nitrate (equivalent to 250 mg. of tetracycline hydrochloride activity), 40 mg. lidocaine hydrochloride, 500 mg. ascorbic acid and 220 mg. magnesium gluconate.

EXAMPLE 8

The pain upon injection and the ability of two compositions of this invention and of two related compositions to produce high blood levels and urine levels by a single injection in human subjects was determined in a study with results as recorded in Table I below. The preparations under study were as follows:

*Preparation 1136.*—A sterile aqueous solution at pH 3.1, prepared as described in Example 7, containing 232 mg. tetracycline hydrochloride activity, as N-(1-pyrrolidinomethyl)-tetracycline nitrate, 40 mg. lidocane hydrochloride, 500 mg. ascorbic acid and 220 mg. magnesium gluconate per 2 cc. vial.

*Preparation 1179.*—A sterile aqueous solution at pH 3.5 containing 250 mg. tetracycline hydrochloride activity, as N-(1-pyrrolidinomethyl)tetracycline, 40 mg. lidocaine hydrochloride, and 300 mg. ascorbic acid per 2 cc. vial.

*Preparation 1192.*—A sterile aqueous solution at pH 5.5 containing 270 mg. tetracycline hydrochloride activity as N-(1-pyrrolidinomethyl)tetracycline, 220 mg. magnesium gluconate and citric acid (as required to adjust the pH to 5.5) per 2 cc. vial.

*Preparation 1138.*—A sterile aqueous suspension at pH 5.1 containing 250 mg. tetracycline hyrrochloride activity, as N-(1-pyrrolidinomethyl)tetracycline nitrate, 40 mg. lidocaine hydrochloride, 100 mg. anhydrous sodium citrate and 260 mg. magnesium gluconate per 2 cc. vial.

*Procedure.*—Two cc. of each of the preparations were administered to each of twenty patients, and the blood and urine levels and pain upon injection attained thereby were measured after periods of ½, 1, 2, 4, 8, 12 and 24 hours after administration. The drugs when administered were coded only A, B, C and D, since they had to be reconstituted with different amounts of distilled water to attain 2 cc. total volume, and the buttocks were randomized. Blood and urine samples were collected as follows: Bloods—½, 1, 2, 4, 8, 12 and 24 hours; urines—0–6, 6–12, 12–24, 24–30, 30–36, 36–48 hour aliquots. Pain upon injection was measured on a rating scale of 0, 1, 2 and 3 (no reaction, slight pain, moderate pain, and acute pain) at ½, 1, 2, 4, 8 and 12 hours after injection.

TABLE III

The average blood levels in mcg./ml. of plasma of the preparations were:

| Time After Administration | 1136 | 1179 | 1192 | 1138 |
|---|---|---|---|---|
| 1/2 | 3.09 | 3.22 | 1.48 | 1.70 |
| 1 hour | 2.12 | 2.32 | 1.36 | 1.56 |
| 2 hours | 1.51 | 1.69 | 1.09 | 1.18 |
| 4 hours | 1.27 | 1.42 | 1.03 | .94 |
| 8 hours | 1.06 | 1.18 | .85 | .84 |
| 12 hours | .86 | .89 | .70 | .66 |
| 24 hours | .49 | .57 | .48 | .42 |

The average urine excretion levels were:

| Time After Administration | 1136 | 1179 | 1192 | 1138 |
|---|---|---|---|---|
| 0–6 hours | 36.07 | 48.58 | 24.43 | 30.95 |
| 6–12 hours | 31.36 | 32.17 | 26.21 | 22.64 |
| 12–24 hours | 32.69 | 47.96 | 38.92 | 26.89 |
| 24–30 hours | 9.99 | 12.27 | 12.23 | 8.36 |
| 30–36 hours | 7.27 | 8.44 | 9.46 | 7.91 |
| 36–48 hours | 1.93 | 12.08 | 11.81 | 9.31 |
| 0–24 hours | 100.12 | 128.71 | 89.56 | 80.48 |
| 24–48 hours | 19.19 | 32.79 | 33.00 | 25.58 |

The average amount of pain as recorded on the rating scale was:

| Time After Administration | 1136 | 1179 | 1192 | 1183 |
|---|---|---|---|---|
| 1/2 hour | .7 | 1.6 | .6 | .9 |
| 1 hour | .6 | 2.2 | .9 | 1.4 |
| 2 hours | .2 | 1.6 | .7 | 1.2 |
| 4 hours | 0 | 1.2 | .2 | .8 |
| 8 hours | 0 | .6 | 0 | .5 |
| 12 hours | 0 | .4 | 0 | .2 |

CONCLUSIONS

*Blood levels.*—1179 gave the highest blood levels at each of the times sampled (½, 1, 2, 4, 8, 12 and 24 hours). Next highest were for 1136. The levels for 1138 were higher than those for 1192 at ½, 1 and 2 hours but lower at the other times.

The 1136 blood levels were not significantly different from the 1179 blood levels except at 4 and 24 hours. The 1136 blood levels were significantly higher than those of 1192 at all times except 24 hours.

The 1138 blood levels were significantly lower than the 1179 blood levels at all of the times. The 1138 blood levels were not significantly different from those of 1192 except at 1 hour.

We claim:
1. A substantially anhydrous mixture comprising a member selected from the group consisting of N-(1-pyrrolidinomethyl)tetracycline and the nontoxic acid addition salts thereof; and a nontoxic acidifying agent, said nontoxic acidifying agent being present in an amount sufficient to adjust the solution, resulting from the reconstitution of said mixture with water, to a pH of not more than 4.
2. A substantially anhydrous mixture comprising a member selected from the group consisting of N-(1-pyrrolidinomethyl)tetracycline and the nontoxic acid addition salts thereof; and a nontoxic α-hydroxycarboxylic acid containing no elements other than carbon, hydrogen and oxygen, said α-hydroxycarboxylic acid being present in said mixture in an amount sufficient to maintain the solution resulting from the reconstitution of said mixture with water at a pH of not more than about 4.
3. A substantially anhydrous mixture comprising from about 125 to 1000 mg. of N-(1-pyrrolidinomethyl)tetracycline and a nontoxic α-hydroxycarboxylic acid selected from the group consisting of citric, gluconic, tartaric, maleic, malic, ascorbic, mandelic, and pyruvic acids, said α-hydroxycarboxylic acid being present in said mixture in an amount sufficient to acidify the solution resulting from the reconstitution of said mixture with water to a pH of from about 3 to about 4.
4. A substantially anhydrous mixture comprising from about 125 to 275 mg. of N-(1-pyrrolidinomethyl)tetracycline and from about 150 to 300 mg. of ascorbic acid.
5. A substantially anhydrous mixture comprising about 275 mg. of N-(1-pyrrolidinomethyl)tetracycline, 40 mg. lidocaine hydrochloride, and about 300 mg. of ascorbic acid.
6. A substantially anhydrous mixture comprising about 412 mg. of N-(1-pyrrolidinomethyl)tetracycline nitrate, 40 mg. lidocaine hydrochloride, 220 mg. magnesium gluconate and 500 mg. ascorbic acid.
7. A therapeutic composition in dosage unit form comprising an aqueous injectable solution of a member selected from the group consisting of N-(1-pyrrolidinomethyl)tetracycline and its nontoxic acid addition salts, said solution having a pH of from 3 to 4.
8. A therapeutic composition in dosage unit form comprising an aqueous injectable solution of N-(1-pyrrolidinomethyl)tetracycline, said solution having a pH of about 3.4.
9. A therapeutic composition in dosage unit form comprising an aqueous injectable solution of N-(1-pyrrolidinomethyl)tetracycline nitrate, said solution having a pH of from about 3 to about 4.

References Cited in the file of this patent

UNITED STATES PATENTS

| | | |
|---|---|---|
| 2,997,471 | Cheney et al. | Aug. 22, 1961 |
| 3,004,894 | Johnson et al. | Oct. 17, 1961 |

FOREIGN PATENTS

| | | |
|---|---|---|
| 3,169/57 | South Africa | Mar. 26, 1958 |
| 561,358 | Belgium | Apr. 3, 1958 |
| 1,044,806 | Germany | Nov. 27, 1958 |
| 227,105 | Australia | Feb. 29, 1960 |
| 1,113,456 | Germany | Sept. 7, 1961 |
| 859,394 | Great Britain | Jan. 25, 1961 |

OTHER REFERENCES

Munchener Medizinische Wochenschrift, vol. 100, No. 17, pp. 661–686, April 25, 1958.